(12) United States Patent
Seo (10) Patent No.: US 9,422,876 B2
(45) Date of Patent: Aug. 23, 2016

(54) METHOD AND SYSTEM FOR CONTROLLING SAFETY OF A BI-FUEL VEHICLE

(71) Applicants: Hyundai Motor Company, Seoul (KR); Kia Motors Corporation, Seoul (KR)

(72) Inventor: Yoo-Jin Seo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 292 days.

(21) Appl. No.: 14/273,210

(22) Filed: May 8, 2014

(65) Prior Publication Data

US 2015/0159570 A1 Jun. 11, 2015

(30) Foreign Application Priority Data

Dec. 9, 2013 (KR) ........................ 10-2013-0152534

(51) Int. Cl.
*F02B 43/00* (2006.01)
*F02D 41/00* (2006.01)
(Continued)

(52) U.S. Cl.
CPC .......... *F02D 41/0027* (2013.01); *F02D 19/022* (2013.01); *F02D 19/027* (2013.01);
(Continued)

(58) Field of Classification Search
CPC ............ F02D 19/0642; F02D 19/0647; F02D 19/0692; F02D 19/0694; F02D 41/0025; F02D 41/0027; F02D 19/02; F02D 19/00; F02D 19/021; F02D 19/027; F02D 19/0615; F02D 19/022; F02D 19/0623; F02D 41/021; F02D 41/22; F02D 2200/602; F02D 41/025; F02M 21/0215; F02M 21/0287; F02M 21/04; F02M 21/047; F02M 21/00; F02M 21/02; F02M 21/0293; F02M 21/06; Y02T 10/36; Y02T 10/40; Y02T 10/32
USPC ......... 123/1 A, 304, 525, 527, 529, 575, 576; 701/103, 104, 110, 112, 114
See application file for complete search history.

(56) References Cited

U.S. PATENT DOCUMENTS 3,994,357 A * 11/1976 Smitley .................. B60K 15/01 137/39
4,335,697 A * 6/1982 McLean ................. F02M 13/08 123/525

(Continued)

FOREIGN PATENT DOCUMENTS

JP 2013-82298 A 5/2013
KR 10-1999-0021651 A 3/1999

(Continued)

*Primary Examiner* — Hai Huynh
*Assistant Examiner* — Raza Najmuddin
(74) *Attorney, Agent, or Firm* — Morgan, Lewis & Bockius LLP (57) ABSTRACT

A method and system for controlling safety of a bi-fuel vehicle may safely control the bi-fuel vehicle when it is in an accident. The method may include detecting a pressure of a vaporizer configured to decompress and vaporize liquefied petroleum gas (LPG) that is one fuel of the bi-fuel vehicle, determining whether the detected pressure of the vaporizer is equal to or higher than a predetermined high pressure, determining whether the detected pressure of the vaporizer is equal to or lower than a predetermined low pressure, determining whether an airbag has been inflated, and switching to a gasoline mode configured to use gasoline if at least one of the detected pressure is equal to or higher than the predetermined high pressure, the detected pressure of the vaporizer is equal to or lower than the predetermined low pressure, and/or the airbag has been inflated is determined to be true.

9 Claims, 6 Drawing Sheets

(51) Int. Cl.
 *F02D 41/22* (2006.01)
 *F02D 41/02* (2006.01)
 *F02M 21/02* (2006.01)
 *F02M 21/06* (2006.01)
 *F02D 19/02* (2006.01)
 *F02D 19/06* (2006.01)

(52) U.S. Cl.
 CPC ........ *F02D19/0615* (2013.01); *F02D 19/0623* (2013.01); *F02D 19/0647* (2013.01); *F02D 41/021* (2013.01); *F02D 41/22* (2013.01); *F02M 21/0293* (2013.01); *F02M 21/06* (2013.01); *F02D 41/0225* (2013.01); *F02D 2200/602* (2013.01); *Y02T 10/32* (2013.01); *Y02T 10/36* (2013.01); *Y02T 10/40* (2013.01)

(56) References Cited

U.S. PATENT DOCUMENTS

| | | | | |
|---|---|---|---|---|
| 5,291,578 A | * | 3/1994 | Kalami | F02D 41/22 123/497 |
| 5,441,026 A | * | 8/1995 | Akimoto | F02D 33/006 123/198 D |
| 5,829,418 A | * | 11/1998 | Tamura | B60K 15/03006 123/198 DB |
| 6,009,860 A | * | 1/2000 | Brown | F02D 17/04 123/198 DB |
| 6,041,762 A | * | 3/2000 | Sirosh | B60K 15/013 123/527 |
| 6,044,806 A | * | 4/2000 | Brown | F02D 19/025 123/27 GE |
| 6,223,714 B1 | * | 5/2001 | Anderson | B60K 28/14 123/198 D |
| 6,390,075 B1 | * | 5/2002 | Yamazaki | F02M 21/0233 123/529 |
| 6,401,698 B1 | * | 6/2002 | Yamazaki | F02D 41/0027 123/529 |
| 6,591,817 B2 | * | 7/2003 | Deutsch | F02D 19/0647 123/525 |
| 7,546,834 B1 | * | 6/2009 | Ulrey | F02D 19/0628 123/525 |
| 9,068,534 B2 | * | 6/2015 | Erasala | F02M 21/0239 |
| 2010/0147262 A1 | * | 6/2010 | Martin | F02D 19/0647 123/299 |
| 2013/0241479 A1 | * | 9/2013 | Wright, Jr. | H02H 5/10 320/109 |
| 2015/0047590 A1 | * | 2/2015 | Kim | F02D 19/025 123/1 A |
| 2015/0192064 A1 | * | 7/2015 | Criel | B60R 21/0136 123/529 |

FOREIGN PATENT DOCUMENTS

| | | |
|---|---|---|
| KR | 2000-0034556 A | 6/2000 |
| KR | 20-0246130 | 8/2001 |
| KR | 10-2002-0084382 A | 11/2002 |
| KR | 10-2007-0027950 A | 3/2007 |
| KR | 10-0980933 B1 | 9/2010 |

* cited by examiner

METHOD AND SYSTEM FOR CONTROLLING SAFETY OF A BI-FUEL VEHICLE

CROSS-REFERENCE TO RELATED APPLICATION

The present application claims priority of Korean Patent Application Number 10-2013-0152534 filed on Dec. 9, 2013, the entire contents of which application are incorporated herein for all purposes by this reference.

FIELD OF INVENTION

The present disclosure relates to a method and system for controlling safety of a bi-fuel vehicle that may safely control the bi-fuel vehicle when it is in an accident.

BACKGROUND OF INVENTION

As is well known to those skilled in the art, a bi-fuel vehicle is used for fuel efficiency, economical efficiency of fuel, exhaust gas, and so on. For example, the bi-fuel vehicle may use both liquefied petroleum gas (LPG) and gasoline.

The bi-fuel vehicle may drive on either gasoline or LPG according to a driver's selection. When the bi-fuel vehicle drives on gasoline, it is referred to as a gasoline mode, while when the bi-fuel vehicle drives on LPG, it is referred to as an LPG mode. In addition, a bi-fuel vehicle may use both LPG and diesel, both gasoline and compressed natural gas (CNG), or both CNG and diesel.

In a case in which a bi-fuel vehicle uses both LPG and gasoline, liquefied LPG in a bombe is vaporized to be combusted in an engine, so a vaporizer is provided with the bi-fuel vehicle. The vaporizer typically reduces a pressure of the liquefied LPG from the bombe, vaporizes it in a gas state, and then supplies it to the engine.

The LPG may be generally injected in the engine by a liquefied petroleum gas injection (LPGi) method or a liquefied petroleum injection (LPI) method, the LPGI method and the LPI method are well known to a person of an ordinary skill in the art, and thus detailed description thereof will be omitted.

However, when internal pressure of the vaporizer of the bi-fuel vehicle is excessively increased or decreased due to an accident, a bad environment, and so on, the bi-fuel vehicle may become a safety hazard, therefore safety measures are required.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present disclosure are directed to providing a method and system for controlling safety of a bi-fuel vehicle that may safely control the bi-fuel vehicle when internal pressure of a vaporizer of the bi-fuel vehicle is excessively increased or decreased due to an accident or a bad environment.

Various aspects of the present disclosure provide a method of controlling safety of a bi-fuel vehicle, including: detecting a pressure of a vaporizer configured to decompress and vaporize liquefied petroleum gas (LPG) that is one fuel of the bi-fuel vehicle; determining whether the detected pressure of the vaporizer is equal to or higher than a predetermined high pressure; determining whether the detected pressure of the vaporizer is equal to or lower than a predetermined low pressure; determining whether an airbag has been inflated; and switching to a gasoline mode configured to use gasoline if at least one of the detected pressure is equal to or higher than the predetermined high pressure, the detected pressure of the vaporizer is equal to or lower than the predetermined low pressure, or the airbag has been inflated is determined to be true.

The method may further include closing a shut-off valve configured to supply the LPG when the bi-vehicle is switched to the gasoline mode.

The determining of whether the airbag has been inflated may be performed based on a signal received through a controller area network (CAN) communication.

The method may further include: detecting whether an operation of an accelerator pedal occurs after the airbag has been inflated; switching to the gasoline mode when the operation of the accelerator pedal occurs; and stopping an engine when the operation of the accelerator pedal does not occur.

The method may further include: dividing the predetermined high pressure into a first high pressure and a second high pressure; promptly switching to the gasoline mode when the detected pressure of the vaporizer is equal to or higher than the first high pressure; switching to the gasoline mode when the detected pressure of the vaporizer is equal to or higher than the second high pressure and the operation of the accelerator pedal occurs; and stopping the engine when the detected pressure of the vaporizer is equal to or higher than the second high pressure and the operation of the accelerator pedal does not occur.

The LPG may be injected in an engine by a liquefied petroleum gas injection (LPGi) method or a liquefied petroleum injection (LPI) method.

Various other aspects of the present disclosure provide a system for controlling safety of a bi-fuel vehicle, including: a vaporizer configured to vaporize LPG in a gas state; a pressure sensor configured to detect pressure of the vaporizer; an airbag module configured to inflate an airbag when a predetermined impact is imparted to the bi-fuel vehicle, and to generate and transmit an airbag inflation signal when the airbag is inflated; an acceleration position sensor (APS) configured to detect a position of an accelerator pedal; and a controller configured to select a fuel mode and to control an operation of an engine based on a signal of the pressure sensor, the airbag inflation signal, and a signal of the APS. The controller is operated by a program, and the program includes a series of commands for executing a method of controlling safety of a bi-fuel vehicle, the method including: detecting the pressure of the vaporizer configured to decompress and vaporize the liquefied petroleum gas (LPG) that is one fuel of the bi-fuel vehicle; determining whether the detected pressure of the vaporizer is equal to or higher than a predetermined high pressure; determining whether the detected pressure of the vaporizer is equal to or lower than a predetermined low pressure; determining whether the airbag has been inflated; and switching to a gasoline mode configured to use gasoline if at least one of the detected pressure is equal to or higher than the predetermined high pressure, the detected pressure of the vaporizer is equal to or lower than the predetermined low pressure, or the airbag has been inflated is determined to be true.

The airbag inflation signal may be transmitted to the controller through a CAN communication.

According to an embodiment of the present disclosure, it is possible to safely control the bi-fuel vehicle when internal pressure of a vaporizer of the bi-fuel vehicle using both LPG and gasoline is excessively increased or decreased due to an accident, a bad environment, or a usage period.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Unless explicitly described to the contrary, the word "comprise" and variations such as "comprises" or "comprising" will be understood to imply the inclusion of stated elements but not the exclusion of any other elements.

Figure 1:
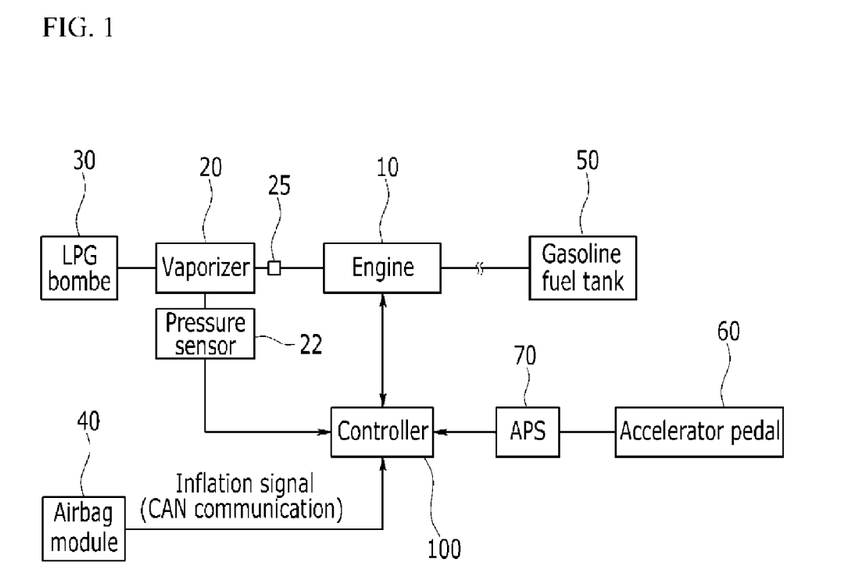
FIG. 1 is a diagram illustrating a configuration of an exemplary system for controlling safety of a bi-fuel vehicle according to the present disclosure.

FIG. 1 is a diagram illustrating a configuration of a system for controlling safety of a bi-fuel vehicle according to various embodiments of the present disclosure. As shown in FIG. 1, the system according to various embodiments of the present disclosure safely controls a bi-fuel vehicle using both LPG and gasoline according to pressure variation of a vaporizer installed in the bi-fuel vehicle.

The system includes: a vaporizer 20 configured to vaporize LPG in a gas state; a pressure sensor 22 configured to detect pressure of the vaporizer 20; an airbag module 40 configured to inflate an airbag when a predetermined impact is imparted to the bi-fuel vehicle, and to generate and transmit an airbag inflation signal when the airbag is inflated; an APS 70 configured to detect a position of an accelerator pedal 60; a shut-off valve 25 configured to shut off LPG being supplied to an engine 10; and a controller 100 configured to select a fuel mode and to control an operation of the engine 10 based on a signal of the pressure sensor 22, the airbag inflation signal, and a signal of the APS 70.

In FIG. 1, reference numeral 10 refers to an engine, 30 refers to an LPG bombe, and 50 refers to a gasoline fuel tank.

In various embodiments of the present disclosure, the vaporizer 20, the pressure sensor 22, the airbag module 40, the APS 70, and the shut-off valve 25 may correspond to those that are generally applied to a bi-fuel vehicle.

The controller 100 may include one or more processors or microprocessors and hardware operated by a program including a series of commands for executing a method of controlling safety of the bi-fuel vehicle according to various embodiments of the present disclosure, which will be described below. The controller 100 may include an engine control unit (ECU). In some embodiments, the controller 100 may be included in the ECU.

The LPG may be injected into the engine 10 by the LPGI method or the LPI method. That vehicles to which the LPGI method or the LPI method is applied are provided with a injector for the LPG and a fuel pump for the LPG which may be similar to or the same as those used in the art, and thus detailed description thereof will be omitted.

Hereinafter, a method of controlling safety of a bi-fuel vehicle according to various embodiments of the present disclosure will be described in detail with reference to the accompanying drawings.

Figure 2:
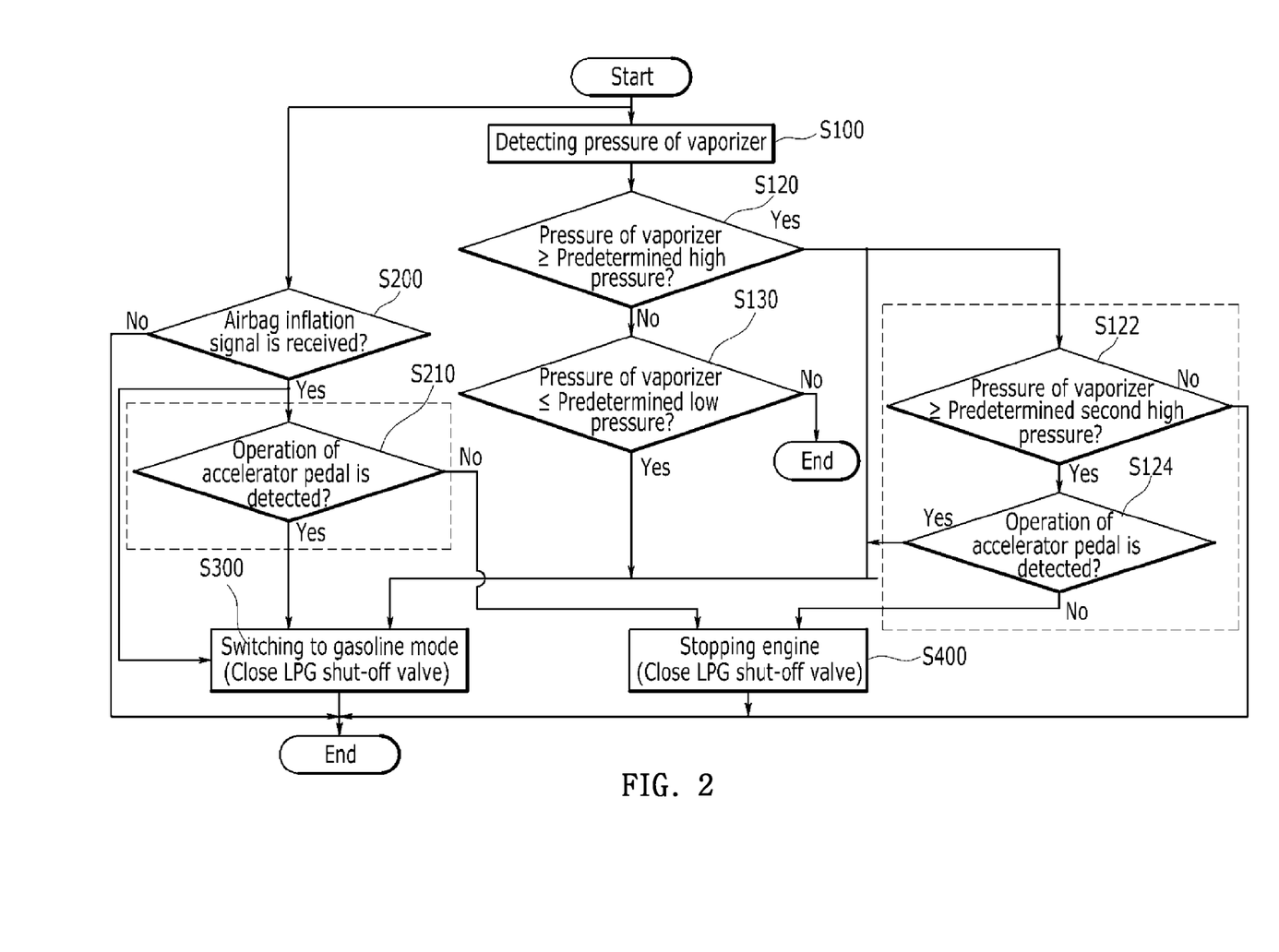
FIG. 2 is a flowchart of an exemplary method of controlling safety of a bi-fuel vehicle according to the present disclosure.

FIG. 2 is a flowchart of a method of controlling safety of a bi-fuel vehicle according to various embodiments of the present disclosure. As shown in FIG. 2, the controller 100 detects a pressure of the vaporizer 20 that decompresses and vaporizes LPG which is one of fuels used in a bi-fuel vehicle through the pressure sensor 22 at step S100.

The controller 100 may detect the pressure of the vaporizer 20 in the same way as in the related art through the pressure sensor 22. The controller 100 detects not only the pressure of the vaporizer 20, but also determines whether a signal caused by airbag inflation is received at step S200.

Figure 3:
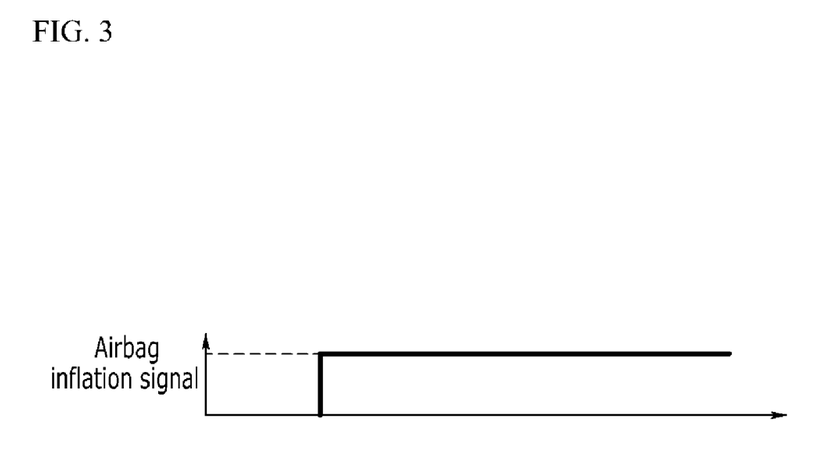
FIG. 3 to FIG. 6 are graphs for explaining exemplary system and method of the present disclosure.
Figure 4:
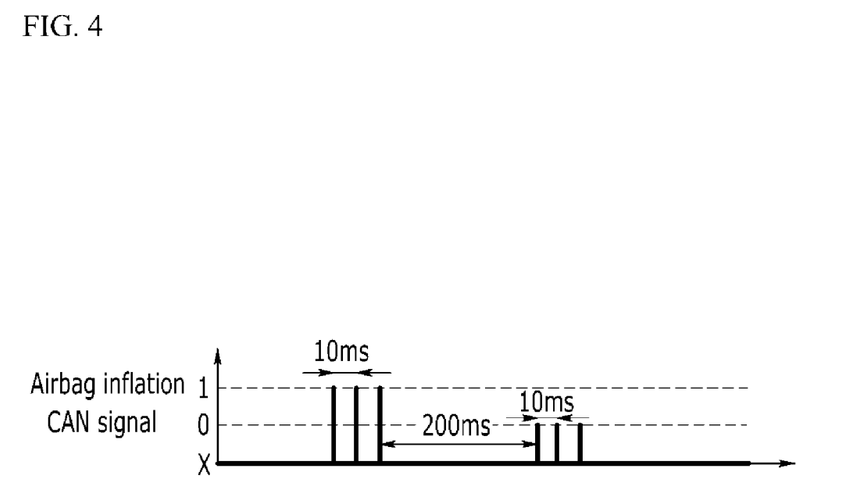
Figure 5:
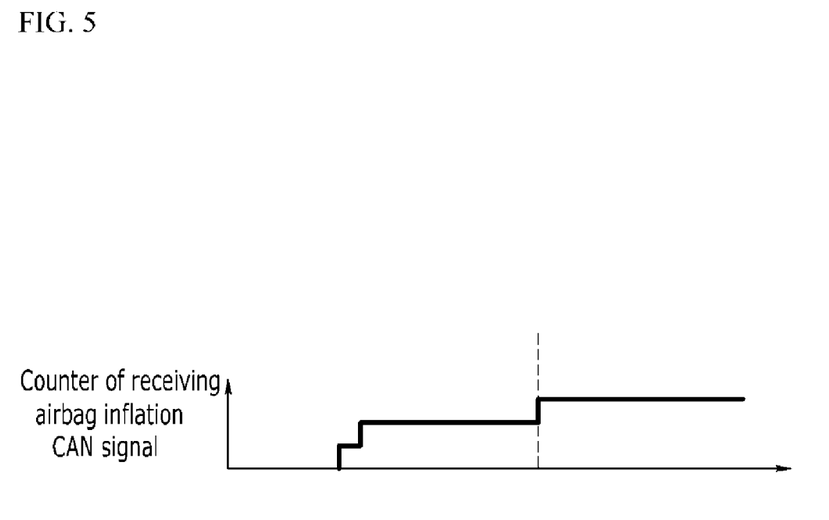

The airbag inflation signal may be configured as shown in FIG. 3. The airbag inflation signal may be received by the controller 100 as a CAN signal, as shown in FIG. 4. When the CAN signal as shown in FIG. 4 is received by the controller 100, the controller 100 may count the number of CAN signals that are received, as shown in FIG. 5. Signal processes as shown in FIG. 3 to FIG. 5 may correspond to those in the related art.

When the airbag inflation signal is received by the controller 100, the controller 100 switches a fuel mode to a gasoline mode to prevent a danger of LPG leakage, at step S300. When the controller 100 switches the fuel mode to the gasoline mode at step S300, the controller 100 may close the shut-off valve 25.

When the airbag inflation signal is received by the controller 100 at step S200, the controller 100 may optionally determine whether the accelerator pedal 60 is being operated through the APS 70 at step S210. When the accelerator pedal 60 is being operated at step S210, the controller 100 determines that a driver has a will to move the bi-fuel vehicle to avoid a dangerous state, so the controller performs step S300. Otherwise, the controller 100 determines that the driver has no will to move the bi-fuel vehicle, so the controller 100 stops operation of the engine at step S400. When the controller 100 stops the engine 10, the controller 100 closes the shut-off valve 25 as well.

Figure 6:
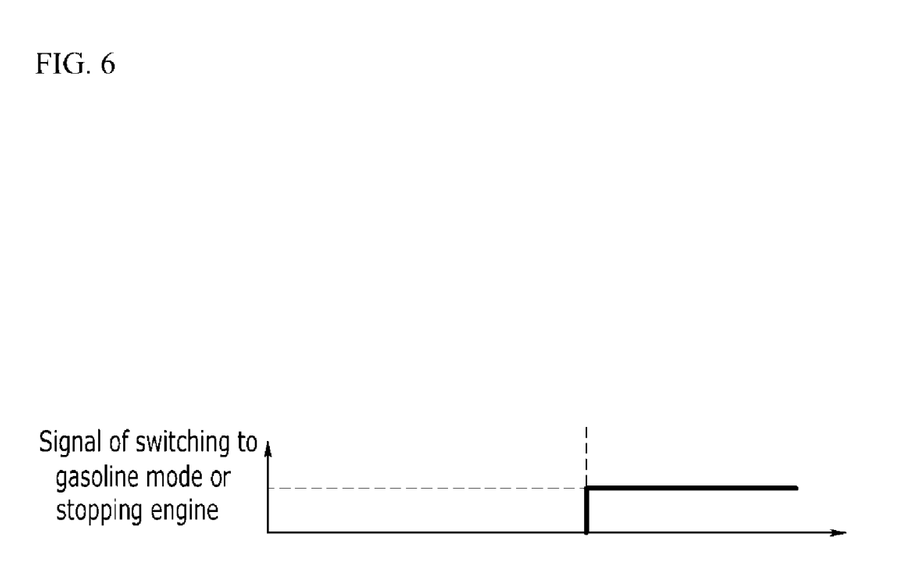

When the pressure of the vaporizer 20 is detected at step S100, the controller 100 determines whether the detected pressure of the vaporizer 20 is equal to or higher than a predetermined high pressure at step S120. When the detected pressure of the vaporizer 20 is lower than the predetermined high pressure, the controller 100 determines whether the detected pressure of the vaporizer 20 is equal to or lower than a predetermined low pressure at step S130. When the detected pressure of the vaporizer 20 is equal to or lower than the predetermined low pressure, which is a state in which it is possible to supply the LPG to the engine 10, the controller 100 switches a fuel mode into the gasoline mode, and closes the shut-off valve 25 for the LPG at step S300. Regarding switching to the gasoline mode and/or closing the shut-off valve, the controller 100 may performs the processes through a signal as shown in FIG. 6.

When the detected pressure of the vaporizer 20 is equal to or higher than the predetermined high pressure at step S120, which is an excessive high pressure state, the controller 100 switches the fuel mode into the gasoline mode, and closes the shut-off valve 25 at step S300.

In the meantime, when the detected pressure of the vaporizer 20 is equal to or higher than the predetermined high pressure at step S120, the controller 100 may optionally determine whether the detected pressure is equal to or higher than the second high pressure at step S122. The second high pressure may be set higher than the predetermined high pressure.

When the detected pressure is equal to or higher than the second high pressure at step S122, which is a dangerous state in which a fire may be caused by LPG leaked in an engine compartment, the controller 100 determines whether the accelerator pedal is operated at step S124.

When the accelerator pedal is operated at step S124, the controller 100 determines that a driver has a will to move the bi-fuel vehicle to avoid a dangerous state, so the controller performs step S300. Otherwise, the controller 100 determines that the driver has no will to move the bi-fuel vehicle, so the controller 100 stops operation of the engine at step S400.

Accordingly, according to the exemplary embodiment of the present disclosure, it is possible to safely control the bi-fuel vehicle when internal pressure of the vaporizer of the bi-fuel vehicle using both LPG and gasoline is excessively increased or decreased due to an accident, a bad environment, or a usage period.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling safety of a bi-fuel vehicle, comprising:
   detecting a pressure of a vaporizer configured to decompress and vaporize liquefied petroleum gas (LPG) that is one fuel of the bi-fuel vehicle;
   determining whether the detected pressure of the vaporizer is equal to or higher than a predetermined high pressure;
   determining whether the detected pressure of the vaporizer is equal to or lower than a predetermined low pressure;
   determining whether an airbag has been inflated; and
   switching to a gasoline mode configured to use gasoline if at least one of the detected pressure is equal to or higher than the predetermined high pressure, the detected pressure of the vaporizer is equal to or lower than the predetermined low pressure, or the airbag has been inflated is determined to be true.

2. The method of claim 1, further comprising:
   closing a shut-off valve configured to supply the LPG when the bi-vehicle is switched to the gasoline mode.

3. The method of claim 1, wherein the determining whether the airbag has been inflated is performed based on a signal received through a controller area network (CAN) communication.

4. The method of claim 2, further comprising:
   detecting whether an operation of an accelerator pedal occurs after the airbag has been inflated;
   switching to the gasoline mode when the operation of the accelerator pedal occurs; and
   stopping an engine when the operation of the accelerator pedal does not occur.

5. The method of claim 4, further comprising:
   dividing the predetermined high pressure into a first high pressure and a second high pressure;
   promptly switching to the gasoline mode when the detected pressure of the vaporizer is equal to or higher than the first high pressure;
   switching to the gasoline mode when the detected pressure of the vaporizer is equal to or higher than the second high pressure and the operation of the accelerator pedal occurs; and
   stopping the engine when the detected pressure of the vaporizer is equal to or higher than the second high pressure and the operation of the accelerator pedal does not occur.

6. The method of claim 1, wherein the LPG is injected in an engine by a liquefied petroleum gas injection (LPGi) method or a liquefied petroleum injection (LPI) method.

7. A system for controlling safety of a bi-fuel vehicle, comprising:
   a vaporizer configured to vaporize LPG in a gas state;
   a pressure sensor configured to detect pressure of the vaporizer;
   an airbag module configured to inflate an airbag when a predetermined impact is imparted to the bi-fuel vehicle, and to generate and transmit an airbag inflation signal when the airbag is inflated;
   an acceleration position sensor (APS) configured to detect a position of an accelerator pedal; and
   a controller configured to select a fuel mode and to control an operation of an engine based on a signal of the pressure sensor, the airbag inflation signal, and a signal of the APS,
   wherein the controller is operated by a program, and the program includes a series of commands for executing a method of controlling safety of a bi-fuel vehicle, the method comprising:
   detecting the pressure of the vaporizer configured to decompress and vaporize the liquefied petroleum gas (LPG) that is one fuel of the bi-fuel vehicle;
   determining whether the detected pressure of the vaporizer is equal to or higher than a predetermined high pressure;
   determining whether the detected pressure of the vaporizer is equal to or lower than a predetermined low pressure;
   determining whether the airbag has been inflated; and
   switching to a gasoline mode configured to use gasoline if at least one of the detected pressure is equal to or higher than the predetermined high pressure, the detected pressure of the vaporizer is equal to or lower than the predetermined low pressure, or the airbag has been inflated is determined to be true.

8. The system of claim 7, wherein the airbag inflation signal is transmitted to the controller through a CAN communication.

9. The system of claim 7, wherein the LPG is injected in the engine by a liquefied petroleum gas injection (LPGi) method or a liquefied petroleum injection (LPI) method.

* * * * *